Patented Sept. 28, 1926.

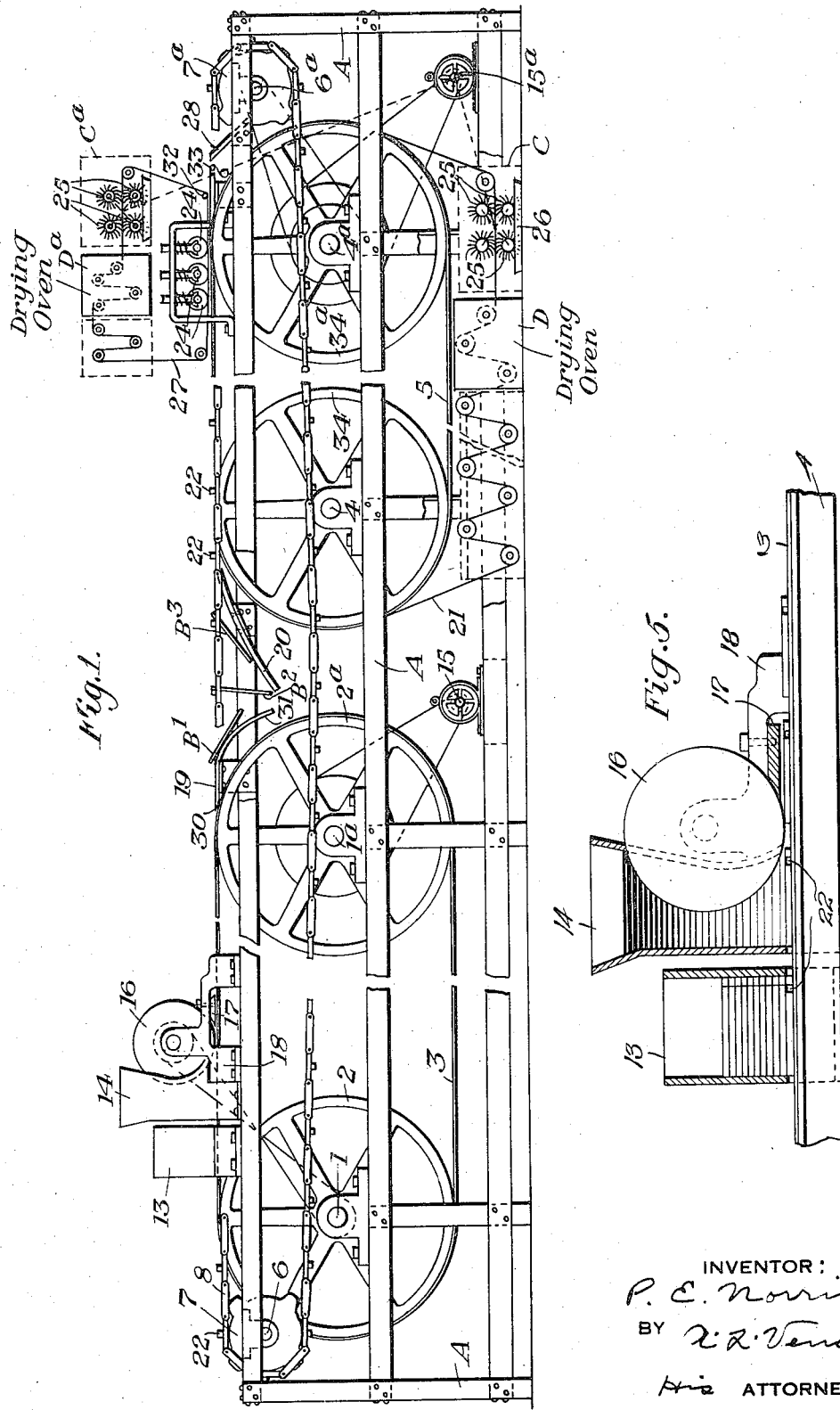

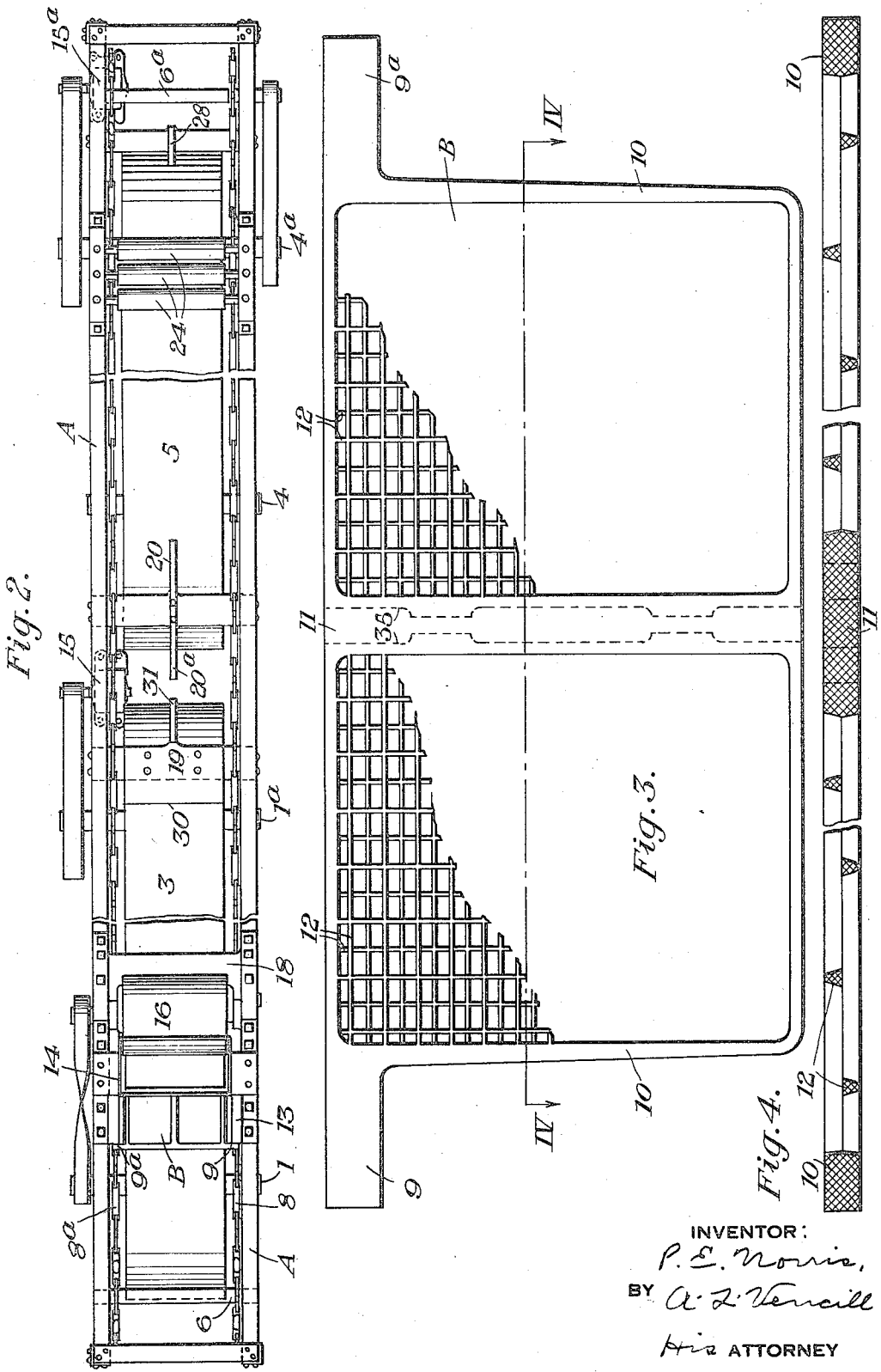

1,601,079

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

MACHINE FOR PASTING STORAGE-BATTERY GRIDS.

Application filed July 31, 1924. Serial No. 729,313.

My invention relates to machine for pasting storage battery grids.

I will describe one form of machine embodying my invention, and will then point out the novel features thereof in claims.

In the accompanying drawings, Fig. 1 is a view showing, in side elevation, one form of pasting machine embodying my invention. In this view parts of the machine are broken away to simplify the drawing. Fig. 2 is a top plan view of the machine illustrated in Fig. 1. Fig. 3 is a detail view showing one form of storage battery grid adapted to be pasted in the machine illustrated in Figs. 1 and 2. Fig. 4 is a sectional view along line IV—IV in Fig. 3 showing the grid to an enlarged scale. Fig. 5 is a detail view showing the hopper, belt and roller shown in Fig. 1, together with a grid passing through this portion of the machine.

Similar reference characters refer to similar parts in each of the views.

Referring first to Figs. 1 and 2, the pasting machine comprises a suitable supporting framework designated in general by the reference character A. Supported in suitable bearings in this framework A are two transverse shafts 1 and 1ª, to which are attached two drums 2 and 2ª, respectively. These two drums carry an endless flexible carrier belt, preferably of sheet metal such as thin steel, and the function of which, as will be explained hereinafter, is to support the grids during a part of the pasting operation.

Two other shafts 4 and 4ª are also suitably journalled in the framework A and carry drums 34 and 34ª, respectively, upon which a second belt 5 similar to belt 3 is carried. The parts are so proportioned that the upper levels of the two belts 5 and 3 are substantially horizontal and in alignment.

Means are also provided for rotating drums 2ª and 34ª. As here shown, a motor 15 is belted to drum 2ª, and a similar motor 15ª is belted to drum 34ª. The parts are so arranged and proportioned that the upper levels of belts 5 and 3 move toward the right and at the same speed.

Suitably supported in framework A are also two shafts 6 and 6ª. Shaft 6 carries two sprocket wheels 7 and shaft 6ª carries two similar sprocket wheels 7ª, upon which sprocket wheels two drive chains 8 and 8ª are carried. These two drive chains are disposed on opposite sides of the carrier belts 3 and 5, they extend the entire length of the machine, and the upper levels of the chains are in the same horizontal planes as the upper levels of the belts. Each chain is provided, at intervals, with upstanding pins 22 arranged to engage the grids as will appear hereinafter and move the grids through the machine. Sprockets 7ª are driven by motor 15 in such manner that the speed of the chains is the same as the speed of the belts.

Machines embodying my invention are particularly adapted for pasting grids constructed as illustrated in Figs. 3 and 4. Each grid B comprises a frame 10 divided into two plate blanks by a centrally disposed rib 11 of solid metal. The paste is forced into the grid on both sides of this central rib and is held in place by the intersecting fins 12. Each grid B is provided with two oppositely disposed outwardly projecting lugs 9 and 9ª and after the grid is pasted the grid is cut along dotted lines 35 in Fig. 3 to form two battery plates, the lugs 9 and 9ª then serving to connect the plates to the terminal straps in the usual manner.

Referring again to Figs. 1 and 2, a magazine 13 for containing a pile of grids B is supported on framework A. Immediately to the right of magazine 13 is a hopper 14 supported on framework A for the purpose of supplying paste to the grids.

A supporting structure 18 is secured to framework A to the right of hopper 14 and carries a pasting drum 16 of cylindrical shape driven by some suitable means so that the lower surface of the drum is adjacent to, and rotates in the same direction as, belt 3, but at a slower speed. As here shown drum 16 is belt-driven from shaft 1.

In operation, the grids to be pasted are placed in magazine B and paste is placed in hopper 14. The lower grid in magazine B will then be so disposed that one pin 22 on each drive chain 8 and 8ª will engage the lugs 9 and 9ª of the grid and will slide the grid out of the magazine and to the right along belt 3 upon which the grid is supported and which moves at the same speed as the grid. The grids are so disposed in the grid hopper 13 that the lugs 9 and 9ª are to the left as viewed in Figs. 1 and 2. The next pair of pins 22 will engage the lugs of the next grid and the chain will therefore feed a series of grids through the machine. As each grid moves under the pasting drum 16, paste from hopper 14 is pressed into the grid by the drum. Due to the difference between the speed of the grid and the peripheral speed of the pasting drum the paste is forced into every interstice of the grid.

It will be observed however, that the pasting drum makes contact with the paste forced into the grid at a line only, and to prevent the drum from extracting the paste from the grid I provide a shoe 17 as best shown in Fig. 1. This shoe is supported by structure 18 and is provided with knife edges at front and rear, the front knife edge being disposed as close as possible to the line of contact between drum 16 and the grid.

After the grid is carried past the pasting drum 16 and while the grid is still on belt 3, the surface of the paste is smoothed manually by operators stationed beside the machine.

Adjacent the right hand end of belt 3, a shoe 19 is supported by framework A. This shoe 19 comprises a knife edge 30 adjacent belt 3 and a downwardly projecting centrally located spur 31. As the grid, driven by chains 8 and 8ª, moves past shoe 19 it is lifted from the belt and the rib 11 of the grid slides down the spur 31 (see B′ in Fig. 1) while the grid lugs are still supported by the chains 8 and 8ª. After leaving the spur 31 the grid occupies the position shown in Fig. 1 at B². By virtue of the fact that the spur 31 touches only rib 11 and not the paste in the grid there is no danger of damage to the soft and plastic paste. A spur 20 is arranged adjacent the left hand end of belt 5, and this shoe engages the rib 11 of the grid as it is moved to the right. The grid then slides on this spur till the grid is supported by belt 5, where the surface is finished and smoothed by other operators stationed beside the machine. It will of course be noticed that in transferring the grid from belt 3 to belt 5 the grid is turned over so that the side which was on the bottom on belt 3 is on the top on belt 5. It follows that in passing through the machine both sides of the grid are finished.

As shown in Fig. 1, a strip 21 of pasting cloth of some suitable absorbent textile material is carried on belt 5 beneath the grid B. As here shown this pasting cloth is in the form of an endless belt which is used over and over. After the cloth 21 has passed over the belt 5, it is washed by scrubbing apparatus C, comprising rotating brushes 25 for scrubbing the belt with water from a pan 26. The cloth then passes through a drying oven D after which it passes again to the belt 5 for another cycle of operation.

A second pasting cloth 27 also in the form of a continuous belt, is arranged to be pressed down on the top of the pasted grids, by means of rollers 24 supported by framework A. These rollers 24 are preferably of resilient material such as soft rubber, and serve to squeeze the grids between pasting cloths 21 and 27 whereby the pasted grids are smoothed and dried. Scrubbing apparatus Cª and a drying oven Dª similar to the corresponding apparatus for cloth 21 are provided for cloth 27 to permit the cloth to be used continuously.

After the grids are drawn under rollers 24, the cloth 27 is stripped from the upper surface of the grid by shaft 32 and cloth 21 is stripped from the under surface of the grid by shaft 33, and the plate then slides onto the spur 28 which engages rib 11 of the grid to lower the grid to a vertical position in which it is held by the engagement of lugs 9 and 9ª thereon with chains 8 and 8ª. The grids are then removed from the machine by an operator.

It should be particularly pointed out that the drive chains 8 and 8ª are spaced transversely from the belts 3 and 5. One advantage of this structure is that excess paste applied to the grid by drum 16 and removed by the operators who finish the two sides of the grid as it moves over belts 3 and 5, may be pushed to the side of the belts where it may drop to a hopper to be collected and replaced in the hopper 14. Were it not for this space between the belt and the chains this excess or waste paste would jam into the drive chains and necessitate stopping the machine frequently for cleaning.

Although I have herein shown and described only one form of pasting machine embodying my invention, it is understood that various changes and modifications may be made therein within the scope of the appended claims without departing from the spirit and scope of my invention.

Having thus described my invention, what I claim is:

1. A battery grid pasting machine comprising a movable belt for carrying a grid, means including a rotatable drum for filling the grid with paste, and a shoe for retaining the paste in the grid as the grid leaves said drum.

2. A battery grid pasting machine comprising a movable belt for carrying a grid, a rotatable drum for forcing paste into the grid, and a shoe adjacent the line of contact of said drum with said grid and having knife edges at front and rear for preventing the drum from extracting paste from the grid.

3. A battery grid pasting machine comprising a movable belt for carrying a grid, a drum for forcing paste into the grid and rotatable at such speed that the peripheral speed of the drum is less than the speed of the grid, and a shoe adjacent the line of contact between said drum and said grid for retaining the paste in the pasted grid.

4. A battery grid pasting machine comprising a rotatable pasting drum, a movable belt adjacent the drum for supporting the grids, and driving means for moving the grids one at a time and at the same speed as the belt between the belt and the drum.

5. In a battery grid pasting machine comprising a movable belt for supporting the grids, the combination with the aforementioned instrumentality of a driving chain parallel with said belt but spaced therefrom by a considerable distance for moving the grids through the machine.

6. A battery grid pasting machine comprising two spaced aligned movable belts for supporting the grids, driving means extending the entire length of the machine and engaging the grids beyond the transverse limits of said belts, and a spur associated with one of said belts for turning each grid whereby opposite sides of each grid engage the two belts respectively.

7. A machine for pasting battery grids each having a rib of solid material extending across the grid, a first movable belt arranged to carry the grids with one side up, driving means for carrying the grids off the end of the belt, a take off shoe having a knife edge for receiving the grids and a spur for engaging the rib of each grid, a second belt aligned with but spaced from the first said belt, and a second spur associated with said second belt and arranged to engage the rib of each grid whereby the grids are placed upon the second belt with said one side down.

8. A machine for pasting storage battery grids each having oppositely disposed plate lugs and a centrally located rib of solid material extending at right angles to said lugs, said machine comprising two spaced aligned movable belts for supporting the grids, two chains one on each side of said belts and extending the whole length of the machine and provided with upstanding pins for engaging said lugs, a take off shoe for removing the grids from the first belt, and a spur associated with said second belt for engaging the rib of each grid whereby the grids are inverted in passing from the first belt to the second.

In testimony whereof I affix my signature.

PAUL E. NORRIS.